Feb. 16, 1932.　　F. MARTI　　1,845,430

RESILIENT PIVOT BEARING

Filed Feb. 27, 1930

Inventor:
F. Marti,
By Langner, Perry, Card & Langner
Attys

Patented Feb. 16, 1932

1,845,430

UNITED STATES PATENT OFFICE

FRITZ MARTI, OF LA CHAUX-DE-FONDS, SWITZERLAND, ASSIGNOR TO SOCIETE ANONYME LES FILS DE L. BRAUNSCHWEIG FABRIQUE ELECTION, OF LA CHAUX-D-FONDS, SWITZERLAND

RESILIENT PIVOT BEARING

Application filed February 27, 1930, Serial No. 431,884, and in Switzerland July 27, 1929.

It is well known that various precision mechanisms are unable to support shocks without suffering damage. This is particularly the case in mechanisms for measuring time such as watches, chronometers and clocks. The fragile parts of these mechanisms are the arbour pivots of which the diameter is very small, as for example the balance staff pivots.

The present invention has for its object a device for absorbing shocks and protecting the pivots in time piece movements, counters and the like, in which the pivot turns in a transversely movable bearing mounted on a stationary support, elastic means being provided between the bearing and the support to hold the arbour in its normal centered position and to return it there after a shock having produced transverse displacement of the bearing. Several embodiments of such device are illustrated by way of example in the accompanying drawings.

Figure 1:
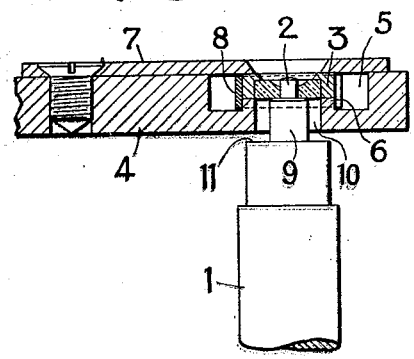
Figure 3:
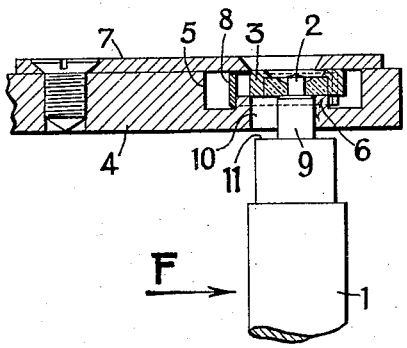
Figure 2:
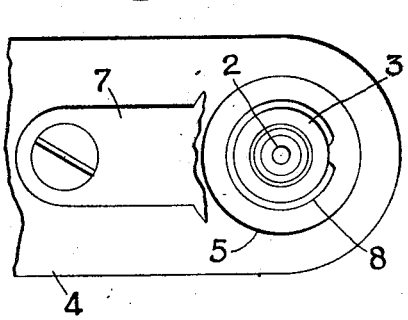
Figure 4:
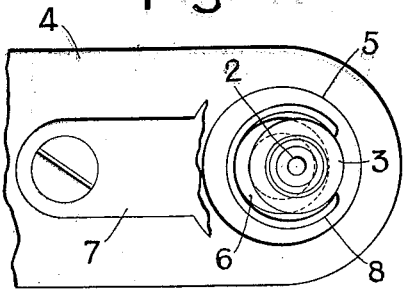
Figure 5:
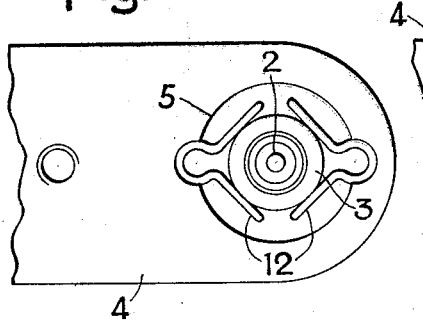
Figure 6:
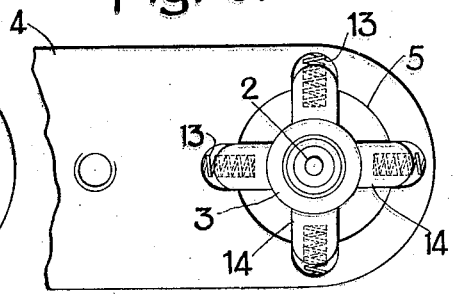

Figure 1 is a section and Figure 2 a plan view of one embodiment. Figures 3 and 4 are corresponding views showing the device at the moment of a violent shock acting in the direction of the arrow F. Figures 5 and 6 show respectively two further embodiments.

In Figures 1 and 2 of the drawings, 1 is the arbour to be protected, 2 its fragile pivot and 3 the bearing or bushing in which the pivot 2 turns. The bearing 3 has the form of a circular disc with an accurately centered hole for the reception of the pivot 2.

The bearing 3 rests on a support 4 which is recessed at 5 concentrically with the arbour 1. This recess at the bottom has a raised annulus 6 also concentric with the arbour 1, and the diameter of which is made as exactly as possible the same as that of the bearing 3. Finally a cover plate 7 retains the bearing 3 axially while permitting it to move laterally in a plane parallel to the plate 7 and the annulus 6 which may be termed a concentric guide.

A gapped annular blade spring 8 forming a circular holder is set around the bearing 3 and the concentric guide 6 to ensure their being exactly coaxial. This spring is shaped so that mounting it in position loads it. The degree of such tensioning and the strength of the spring 8 are such that normal forces exerted by the pivot 2 on the bearing 3 do not deform the spring. On the other hand its force must be sensibly lower than that which would break or damage the pivot 2.

The device acts as follows:

While the normal forces which do not endanger the pivot 2 are acting the bearing 3 rests absolutely immobile in coaxial position with respect to the arbour 1, owing to the tension of the spring 8 and its bearing on the guide 6. The whole functions exactly like an ordinary rigid bearing. But if now a violent shock tends to move the arbour 1 in the direction of the arrow F (Figures 3 and 4) with a force exceeding in value the mechanical resistance of the pivot 2, the bearing 3 is displaced by the thrust of the pivot in the direction of action of the shock, opening or enlarging the form of the blade spring 8 without the pivot 2 suffering since it is more resistant than the spring 8.

This displacement of the bearing 3 is nevertheless limited by the reduced play allowed to the robust part 9 of the arbour 1 within the hole 10 of the support 4. If it reaches this limit this robust part 9 transmits the shock directly to the support 4, without damaging the pivot 2. Directly the shock ceases, the abnormal force having disappeared, the spring 8 owing to its tensioning immediately returns the bearing 3 to its normal position concentric to the guide 6.

This device therefore enables any radial shock within the limits of resistance of the arbour 1 at 9 and the support to be taken up without damage to the pivot 2 and the bearing 3.

The absorption of axial shocks can also be provided for by making the cover plate 7 in the form of an elastic spring plate yielding to the action of an abnormal axial thrust on the bearing 3 until the shoulder 11 on the arbour 1 comes into contact with the rigid support 4.

After the abnormal force has disappeared the cover plate 7 and the bearing 3 recover their original positions.

In the case of the balance staffs of time piece movements, the bearings 3 are generally fitted with very fragile jewels, but these are completely protected by the device above described. Where a watch or clock movement of the usual construction cannot sustain a fall of more than 20 cms. without damage, the same movement furnished with the described protection will withstand a fall of several metres, say 10 times as much as before.

Figure 5 shows a protection device comprising two springs 12 for centering the bearing 3 in place of the single spring 8, co-acting with the bearing 3 and the concentric guide (not seen). It will readily be understood that their function is similar to that of the spring 8.

A third embodiment is shown in Figure 6 in which four coil spring 13 act through shoes 14 on the bearing 3 and the concentric guide (not seen).

What I claim is:

1. A device for the absorption of shocks and the protection of arbour pivots in time piece movements, counters and the like, comprising a stationary plate, a hole therein coaxial with the axis of rotation of the arbour for the passage of a stronger portion thereof, an annular flange part on said plate extending around its hole, a transversely movable bearing for the arbour pivot mounted on said annular flange part and having its peripheric wall in alignment with the peripheric wall of said annular flange part, and at least one spring arranged to press in the same direction upon the peripheric walls of both said bearing and said annular flange part to center the two with respect to one another, the wall of said hole constituting a stop to limit transverse displacement of the arbour under the action of a shock, whilst the said spring is adapted to return it into centered position after such displacement.

2. A device for the absorption of shocks and the protection of arbour pivots in time piece movements, counters and the like, comprising a stationary plate, a hole therein coaxial with the axis of rotation of the arbour for the passage of a stronger portion thereof, an annular guide part on said plate extending around its hole, a transversely movable bearing for the arbour pivot mounted on said annular guide part and a split annular blade spring embracing both said bearing and said annular guide part to hold the arbour in its normal centered position, the wall of said hole constituting a stop to limit transverse displacement of the arbour, under the action of a shock, whilst the said spring is adapted to return it into centered position after such displacement.

3. A device for the absorption of shocks and the protection of arbour pivots in time piece movements, counters and the like, comprising a stationary plate, an annular guide part thereon coaxial with the axis of rotation of the arbour, a transversely movable bearing for the arbour pivot mounted on said annular guide part and a split annular blade spring embracing both said bearing and said annular guide part to hold the arbour in its normal centered position and to return same thereinto after a transverse displacement.

In witness whereof I have hereunto signed my name this 14th day of February, 1930.

FRITZ MARTI.